United States Patent [19]
Lebrun

[11] 3,943,007
[45] Mar. 9, 1976

[54] BATTERY OF STORAGE CELLS
[75] Inventor: Roger Lebrun, La Queue en Brie, France
[73] Assignee: Saft-Societe des Accumulateurs Fixes et de Traction, Romainville, France
[22] Filed: May 17, 1974
[21] Appl. No.: 470,973

[30] Foreign Application Priority Data
May 22, 1973 France .................. 73.18485

[52] U.S. Cl. ................... 136/170; 136/180
[51] Int. Cl.² ........................... H01M 2/12
[58] Field of Search ............. 136/170, 179, 180

[56] References Cited
UNITED STATES PATENTS
| | | | |
|---|---|---|---|
| 767,554 | 8/1904 | Edison | 136/179 |
| 1,224,455 | 5/1917 | Engle | 136/179 |
| 1,285,659 | 11/1918 | Ford | 136/180 |
| 2,186,148 | 1/1940 | Raney | 136/170 |

Primary Examiner—Donald L. Walton
Attorney, Agent, or Firm—Kenyon & Kenyon Reilly Carr & Chapin

[57] ABSTRACT

The invention relates to semi-open battery of storage cells each likely to evolve a large volume of hydrogen, more particularly during overcharge.

A battery according to the invention comprises an intermediate or dummy lid so located with respect to the regular lid of the battery to enable the inflammable gas flow generated in the cells to be isolated from the flow of fluid or gas serving for cooling of the electrical connections of the storage cells and thus avoiding or eliminating all danger of explosion.

19 Claims, 9 Drawing Figures

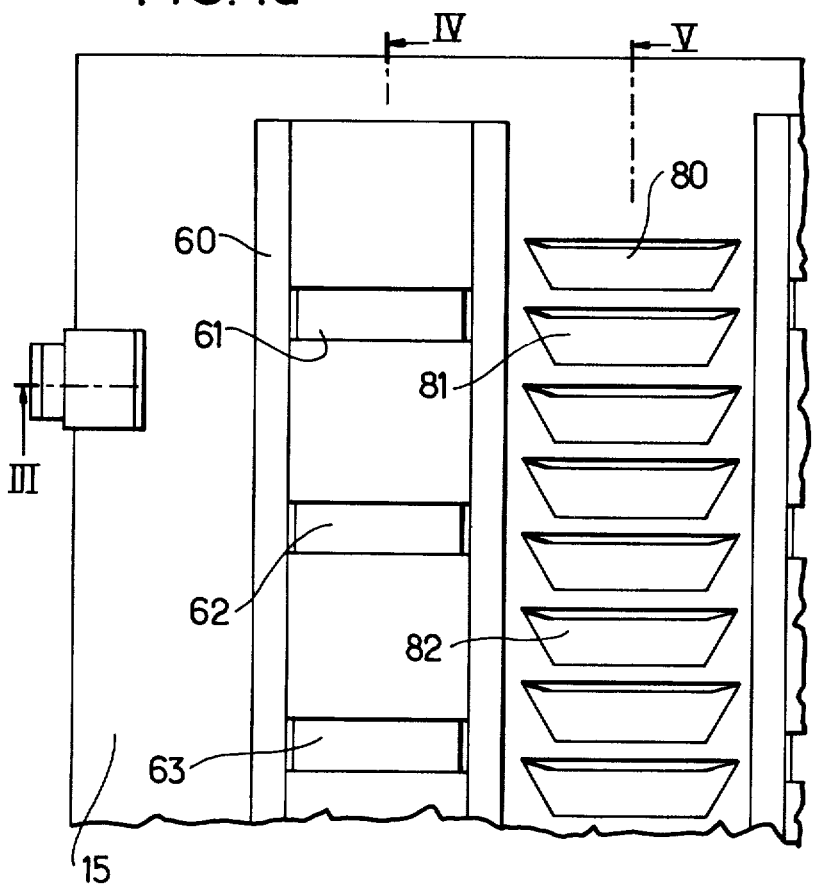
FIG.4a
FIG.4c
FIG.4b
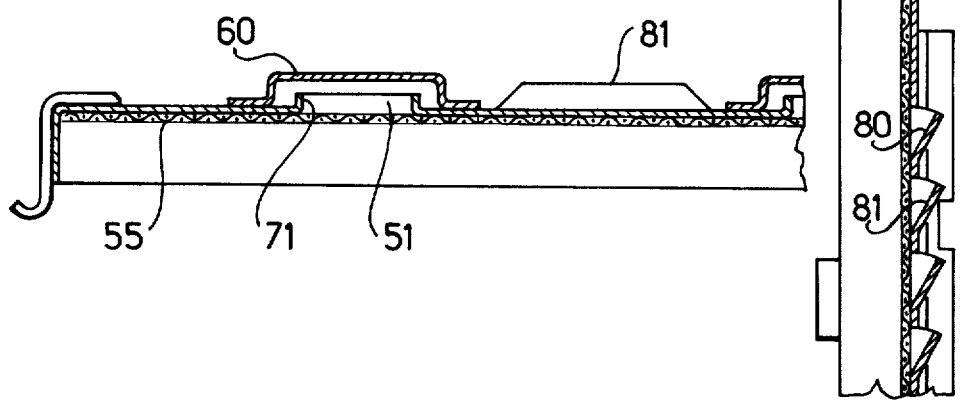
FIG.4d 3,943,007

BATTERY OF STORAGE CELLS

BACKGROUND AND BRIEF SUMMARY OF INVENTION

The invention applies more particularly to nickel-cadmium batteries installed on board aeroplanes.

The present invention concerns a battery of storage cells and more particularly, a semi-open storage battery, for example, a nickel-cadmium battery.

Such a battery comprises, generally, several storage cells arranged side by side in a general casing closed by a removable lid. Each storage cell comprises a container provided with two output terminals and a bleed valve for gases liable to be evolved during the electrochemical reaction and connections outside of the containers that electrically connect up either in parallel or in series, as the case may be, the terminals of two adjacent storage cells, or, if need be, the terminals of the storage cells to the outside terminals of the battery.

The lid of the said battery has breather holes enabling, on the one hand, the removal of the gases given off by the storage cells and, on the other hand, a flow of air enabling the cooling of their electrical connections.

Numerous uses of a semi-open or semi-sealed storage cell connected as a battery require a rapid recharge of that battery For this purpose, a method of rapid recharging at a constant current in which the current is cut off only when the battery is in a state of overcharge, that state being accompanied by a large emission of gas and more particularly of hydrogen, is known.

Consequently, the electrical connections between the storage cells are surrounded by a mixture of air and gas which may well be explosive if the proportion of hydrogen is greater than 4%. This is then sufficient for a spark that may be caused accidentally at the level of the electrical connections, for instance, in consequence of an insufficient contact between the metallic parts or of a defective tightening of the nuts, to cause an explosive ignition of the gaseous mixture.

For certain batteries used in mines, the problem has been solved by covering the electrical connections of the storage cells with a liquid or solid insulator. But that solution has the disadvantage of preventing all accessiblity to the connections and hence all necessary checks required for proper maintenance.

An aim of the present invention is to overcome that disadvantage.

The present invention has for an object the provision of a battery comprising several storage cells arranged side by side in a general casing closed by a lid, each storage cell comprising a bleed valve for the gases which it may emit and two terminals connected by outside electrical connections to the terminals of the adjacent storage cells, characterized in that it comprises means for conveying the gases likely to be emitted through valves up to first openings formed in the said lid.

The lid of the casing is provided with second openings which form a part of an air flow circuit for the cooling of the connections between storage cells. These second openings are separated from the means for conveying gases emitted during the electrochemical reaction in the cells, more particularly during the overcharge of the battery.

According to an embodiment which is of particular advantage, the means for conveying the gases comprises an intermediate or dummy lid inserted between the lid of the casing and the storage cells. This dummy lid is perforated directly above the electrical connections, in order to allow the flow of air for their cooling; it also comprises funnels whose first ends lead out into the first openings of the lid and whose second ends are fitted about the outlets of the valves of the storage cells.

Other characteristics and advantages of the invention will become apparent from the following description which will be made with reference to the accompanying drawing, given by way of an illustration but having no limiting character and in which:

FIG. 4a is a partial top plan view of the lid of the casing; and

FIGS. 4b, 4c, 4d are respectively partial cutaway views taken along lines III, IV and V of FIG. 4a and viewed in the direction of the arrows.

DETAILED DESCRIPTION

Figure 1:
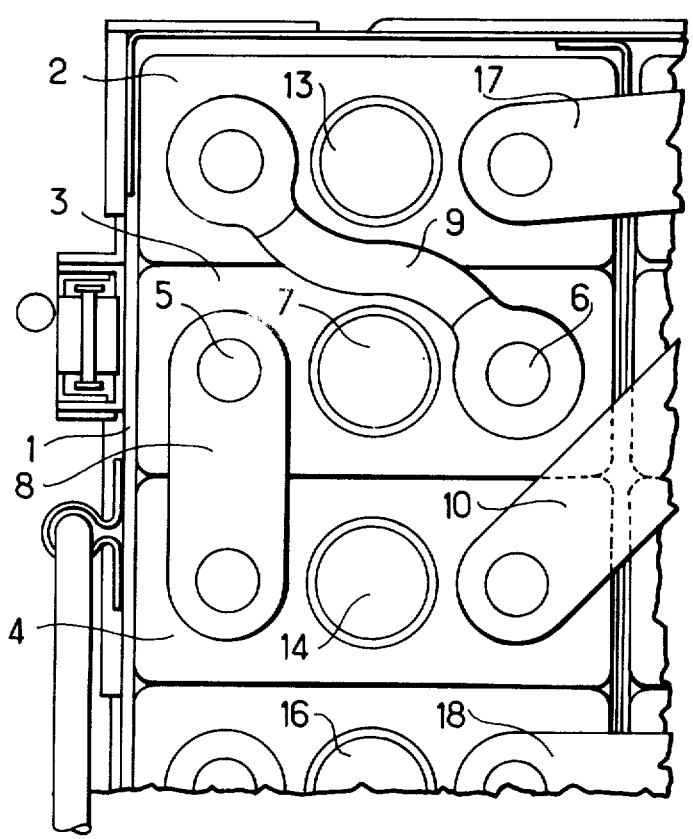
FIG. 1 is a partial top plan view of the casing filled with storage cells, without its lid.

FIG. 1 shows a battery comprising a metal casing 1, for example, of stainless steel containing storage cells such as 2,3,4 arranged side by side. Each storage cell, for example, the cell 3, comprises two output terminals 5 and 6 and a valve 7 for the escape and removal of gases emitted during the electrochemical reactions in the respective cells, more particularly during the recharge of the battery.

The appropriate terminals of two adjacent storage cells are connected together by electrical connectors such as the connectors 8, 9, 10, 17, 18, each located outside the storage cells and secured as by bolting or otherwise to the respective cell terminals and forming in the embodiment shown a series of these storage cells. Obviously, any other method of electrical cell interconnection is possible, e.g. parallel or series-parallel as may be required.

Figure 2:
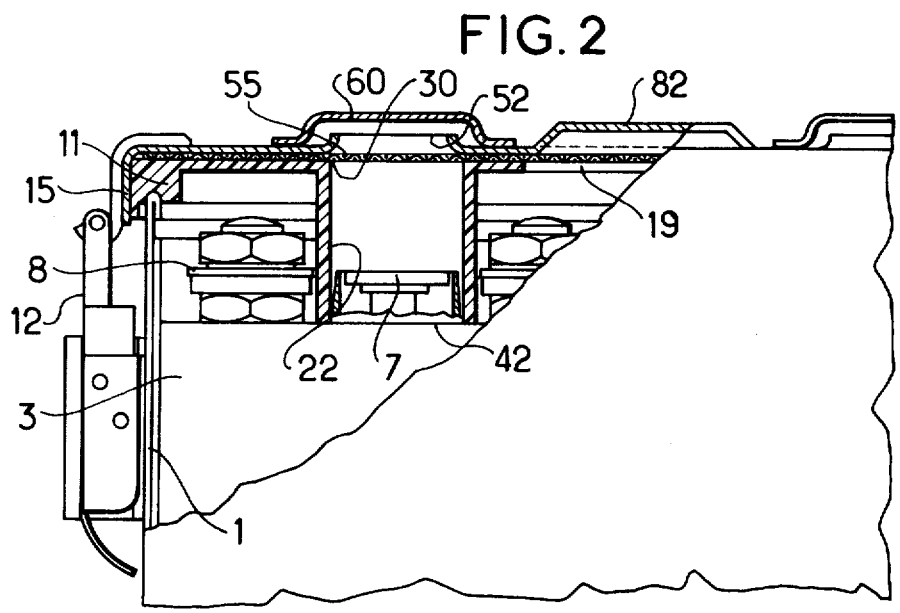
FIG. 2 is a partially cutaway elevational view of the battery including its casing and fitted with its lid and intermediate or dummy lid.

FIG. 2 is a partial elevation view in partial section of the storage cell 3 equipped with its gas escape valve 7 and its connector 8. The casing 1 is shown in this figure as closed by a lid 15 of metal such as stainless steel or other material maintained in place as by means of conventional spring clamping systems such as the system 12. The lid 15 will be described in detail hereinafter.

Figure 3A:
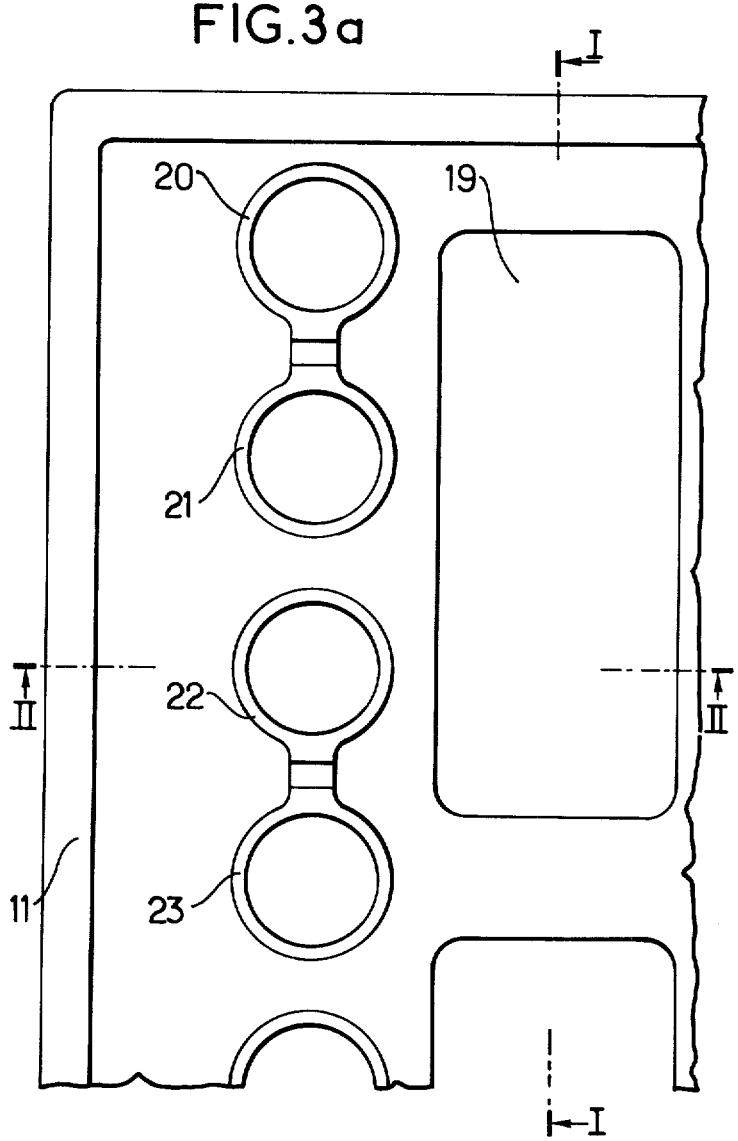
FIG. 3a is a partial plan view from below of the dummy lid.
Figure 3B:
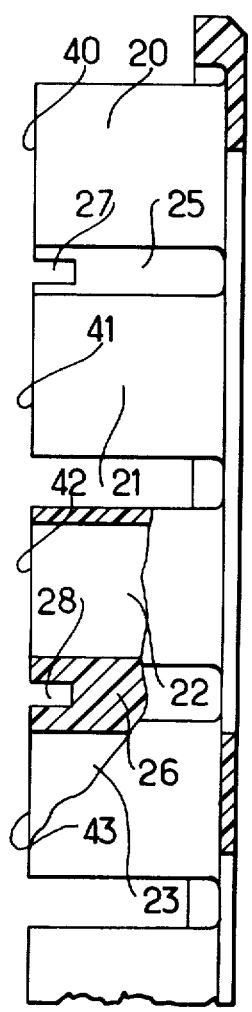
FIGS. 3b and 3c are respectively partial sectional views taken along lines I—I and II—II of FIG. 3a and viewed in the direction of the arrows.
Figure 3C:
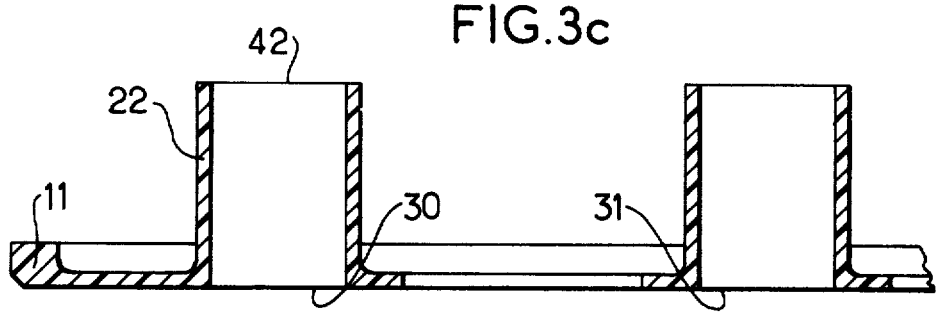

An intermediate or dummy lid 11, details of whose structure are given in FIGS. 3a, 3b, 3c is disposed between the lid 15 and the upper outer faces of the containers of the storage cells. The dummy lid 11, made of a heat-resisting material, for example, a slightly flexible silicone elastomer is adjusted to conform generally with and fit within the inner face of the lid 15. It is perforated, i.e. provided with an opening directly above the electrical connectors, for example, the opening or slot 19, above the connectors 17, 10 and 18. It is provided, on the storage cell side, with downwardly extending tubes or funnels such as 20, 21, 22, 23. These funnels have first or upper ends such as 30 and 31, leading outwardly toward the lid 15, as will be explained in detail hereinafter and second lower or inner ends 40, 41, 42, 43, adapted respectively to fit around the outlets of the valves, 13, 7, 14, 16 of the storage cells illustrated in FIG. 1.

Adjacent pairs of neighboring tubes or funnels, for example, the funnel pairs 20, 21 and funnel pairs 22, 23 are connected together respectively by stiffeners 25 and 26 with inner ends bearing against the covers of the respective storage cell containers; these stiffeners have, to great advantage, notches 27 and 28 adapted to be fitted over thickened rims provided at the upper peripheries of the containers of two adjacent storage cells when the upper faces of the covers of these containers are in the shape of bowls. Thus, the dummy lid 11 makes it possible to chock the storage cells 2, 3, 4, etc. in the casing 1, when the lid 15 is mounted in its covering position on the casing over the battery formed by these cells and clamped.

The lid 15, illustrated in detail by the FIGS. 4a, 4b, 4c, 4d is provided on its under face with a protective metal screen 55 fixed to said inside face. The lid 11 further is provided with a first series of perforations or openings 50, 51, 52, coinciding with the first ends 30, 31, etc. of the funnels 20, 21,22 which latter surround the outlets of respective cell valves 13, 7 and 14 (see FIG. 2).

The arrangement of the storage cells 2, 3, 4, etc. in the casing 1 is such that the respective valves 7, 13, 14, etc. their funnels and, consequently, the first series of openings 50, 51, 52 of the lid 15 are aligned vertically and form a row. Above the row formed by the openings 50, 51, 52, a protective part 60 is provided. This part which is secured to the upper face of lid 15 has ventilation orifices 61, 62, 63 which are staggered in relation to the first openings 50, 51, 52. To great advantage the openings 50, 51, 52 have upstanding rims 70, 71, forming a baffle with the protective part 60 and thus serving to prevent accidental ingress of foreign bodies to the inside of the battery. Lastly, the lid 15 has a second series of openings constituted by vents 80, 81, 82 that are situated above the slot 19 of the intermediate or dummy lid 11 and consequently, above the electrical connections 17, 10 and 18 of the storage cells.

FIG. 2 shows clearly the relative positions of the storage cells, of the dummy lid 11 and of the lid 15, when the latter is clamped or locked on the casing 1 as by clamping means 12. Such an arrangement makes it possible to isolate completely two gaseous flow streams.

The stream of gases emitted via the valves 13, 7, 14, 16, etc. of the storage cells during their charge and, more particularly, the large volume of gases emitted at the time of overcharge, flows via the respective funnels 20, 21, 22, etc. of the dummy lid 11 to escape via the first openings 50, 51, 52 of the lid 15 and orifices 61, 62, etc. of protective part 60 in a region remote from the battery terminals.

The cooling air constituting a second separate flow of gas for cooling the connections is directed to flow separately around the connections and terminals of the battery via the slots of the dummy lid 11, such as the slot 19 and the second openings 80, 81, 82 etc. of the lid 15. This cooling gas flow may be natural or a circulation as may be forced as by an auxiliary installation outside the battery.

The intermediate or dummy lid hereinabove described makes it possible to isolate effectively the electrical terminals and connectors of the storage cells from the gases evolved in the cells, while enabling rapid access to the said terminals and connections by simple, quick removal of the lids 11 and 15 as a unit when such access is required. It is of particular advantage when the use of the battery requires frequent checks, this being the case, for example, with batteries installed on board aeroplanes.

It must be understood that the invention is not limited to the embodiment described and illustrated. Without departing from the scope of the invention as claimed, certain means may be replaced by equivalent means; thus, for example, the dummy lid may be replaced by any suitable conveying system; the material of which it is made has been given only by way of an example. There is no intention of limitation to the exact disclosure hereinabove presented.

The invention applies more particularly to semi-open or semi-sealed nickel-cadmium storage cell batteries having an alkaline electrolyte, but it may be applied to any battery whose storage cells are capable of generating a large volume of hydrogen or other highly inflammable gas during use or charging, or overcharging.

What is claimed is:

1. Battery comprising several storage cells arranged adjacently and side by side in a general casing closed by a main lid having first openings, each storage cell comprising a bleed valve for the gases which it emits and two terminals connected by external electrical connectors to terminals of any adjacent storage cell, said battery comprising means for directing and conveying the gases from the respective cells liable to be emitted via the valves outwardly via said first openings formed in the said lid, said means comprising a dummy lid positioned between the said main lid and the storage cells, said dummy lid being perforated directly above said electrical connectors and also comprising funnels having first ends leading outwardly into the said first openings of the said main lid and having second ends mounted around respective outlets of the valves of said storage cells, and means including second openings in said lid forming a part of an air flow circuit for effecting the cooling of the said electrical connectors, said air flow circuit being separate from the means for directing and conveying said emitted gases.

2. Battery according to claim 1, including individual containers for respective cells, a cover for each container and stiffener means connecting adjacent pairs of said funnels, said stiffener means also bearing against the respective covers of the said storage cell containers.

3. Battery according to claim 2, wherein a rim is defined between each cover and cell container providing an extra-thick part at the rims of the containers of two adjacent storage cells and wherein each said stiffener has a notch to fit over and accomodate a such extra thick part.

4. Battery according to claim 1 wherein the said first openings of the main lid respectively are situated directly above the respective valves of the storage cells and form a row, and non-fluid tight protective parts overlying said first openings.

5. Battery according to claim 4, wherein the said protective parts have orifices in staggered relation to the said first openings.

6. Battery according to claim 5, wherein the said first openings of the main lid have rims forming a baffle with the said protective parts.

7. Battery according to claim 1, including a protective screen positioned on the inside face of the said main lid.

8. Storage cell battery according to claim 1, wherein the said dummy lid is of an elastomer capable of withstanding heat.

9. Storage cell battery according to claim 8, wherein the said elastomer basically contains silicone.

10. Storage cell battery according to claim 1 wherein the said casing and the said main lid are made of stainless steel.

11. Battery according to claim 1, wherein each cell comprises a nickel-cadmium stoage cell with an alkaline electrolyte therein.

12. Battery of the type comprising a plurality of storage cells having bleed valves for gases generated therein and inter-electrical connectors between terminals of cells located in a casing having a removable main lid, such lid having gas escape openings for said gases and other openings for circulating cooling fluid to said connectors and terminals, said battery further comprising means for isolating and directing flow of said generated gases from respective cells outwardly via said first-named openings in a region remote from said connectors and terminals, and independent cooling fluid flow circuit means including said other openings for directing flow of said cooling fluid to said connectors and terminals.

13. Battery according to claim 12 wherein said first-named means comprises a dummy lid having tubular funnels fitted about respective bleed valve outlets, said funnels being alined with said escape openings.

14. Battery according to claim 12 including baffle means for preventing ingress of deleterious material to the battery via said escape openings.

15. Battery according to claim 12 including a dummy lid having an opening alined with said other openings in said main lid as part of said fluid cooling circuit flow means.

16. Battery according to claim 12 including a dummy lid having tubular funnels fitted about said respective of said bleed valves and communicating directly with said escape openings in said main lid, said dummy lid having a separate opening communicating directly with said other openings in said main lid as part of said fluid cooling circuit flow means, and means for preventing ingress of deleterious material to the battery.

17. Battery according to claim 16 wherein said last-named means includes a protective screen on the inner face of said main lid spanning the openings in the latter.

18. Battery according to claim 16 wherein said last-named means includes baffle means on the main lid so as to preclude entry of deleterious material to said battery via said escape openings.

19. Battery according to claim 18 wherein said baffle means includes a cover spanning said escape opening in said main lid and said cover having additional openings in position of staggered relationship to said escape openings.

* * * * *